3,413,222
GREASE COMPOSITIONS
Bruce W. Hotten, Orinda, Calif., assignor to Chevron Research Company, San Francisco, Calif., a corporation of Delaware
No Drawing. Filed Dec. 27, 1965, Ser. No. 516,704
5 Claims. (Cl. 252—351)

ABSTRACT OF THE DISCLOSURE

Grease composition thickened by aluminum alkyl or alkenylsuccinate in which the alkyl and alkenyl groups are straight chain and contain from 11 to 24 carbon atoms.

---

This invention relates to grease compositions especially suitable for uses at high temperatures. More specifically, it relates to greases thickened by certain aluminum soaps of alkyl and alkenyl-substituted succinic acids, and more particularly where the alkyl and alkenyl substitution is by a straight-chain group. The greases so formed have extremely high melting points and are extremely heat stable.

It has become increasingly important that grease compositions be able to lubricate effectively at high temperatures, that is, at temperatures in the range of from 350° F. to over 500° F. As evidence of these requirements, numerous specifications of government agencies and industry now specify that grease compositions have minimum dropping points of 400° F. This requirement is due to the increased driving power and increased speeds of automobiles, machinery, aircraft, etc. The increased temperatures are also due in part to the development of smaller and faster gears, etc., which operate at higher speeds and thus produce high temperatures.

In the past, metal soaps of mono- and dicarboxylic acids, especially lithium soaps, have been employed for such high temperature applications as previously described. U. S. Patent 2,528,373, for example, discloses in a general fashion that magnesium, aluminum and beryllium alkyl and alkenylsuccinate soaps are useful as grease thickeners. However, the aluminum soaps in particular, being derived from branched-chain hydrocarbons (e.g. tetrapropylenes), were found to give insufficient penetration values when employed alone as thickeners, and it was found to be necessary that they be employed in combination with conventional monocarboxylic acid soaps to provide effective thickening power.

It has now been found that grease compositions having extremely high dropping points and highly resistant to heat degradation can be compounded from a major proportion of an oil of lubricating viscosity and, in amount sufficient to thicken the oil to a consistency of a grease, and aluminum soap of a substituted succinic acid of the formula:

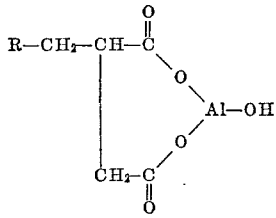

in which R is a linear alkyl or alkenyl group of from 10 to 24 carbon atoms.

Thus, the alkyl or alkenyl group is derived from a straight-chain monoolefin, for example, a cracked-wax olefin. It is imperative that the olefin be linear. Thus, materials which are branched in character, such as polypropylene and butylene polymers, are not suitable for use in the compositions of this invention. A preferred material is derived from a cracked-wax olefin of from 10 to 24 carbon atoms and more preferably from a cracked-wax olefin of from 15 to 20 carbon atoms.

The thickeners of this invention are usually prepared by first reacting the aforementioned olefin with maleic anhydride, a reaction well known in the art. The resulting alkenylsuccinic anhydride may be hydrogenated to the alkyl material. The anhydride may then be hydrolyzed and then reacted with aluminum ion in the form of an alkoxide to form the soap. Alternatively, the acid produced by hydrolysis may be reacted with an inorganic salt of aluminum (e.g. aluminum sulfate) and precipitated from water solution.

The following examples illustrate the preparation of the compositions of this invention. The examples are illustrative and non-limiting.

Example 1.—Preparation of alkenylsuccinic anhydride 176 g. (1 mol) of a mixture of $C_{11}$–$C_{15}$ cracked-wax olefins were mixed with 98 g. (1 mol) of maleic anhydride in a reaction vessel and stirred at a temperature of 200–240° C. for a period of 10 hours. The reaction yielded a viscous material having a bromine number of 43 and a normal equivalent weight of 150, compared to a bromine number of 45 and an equivalent of 146 for the theoretical alkenylsuccinic anhydride.

Example 2.—Preparation of alkenylsuccinic acid 137 g. (0.5 mol) of the product of Example 1 and 40 g. of NaOH (1 mol) were mixed in a vessel containing 500 g. of $H_2O$ and 125 g. of isopropanol. The mixture was stirred for 60 minutes, and then 100 g. of concentrated HCl solution (1 mol) was added to precipitate the acid from the solution. The yield was 110 g. The neutral equivalent for the acid was 166 (calculated 155).

Example 3.—Preparation of cracked-wax olefin-substituted succinate soap 178 g. (0.5 mol) of an alkenyl-substituted succinic anhydride in which the alkenyl group was derived from a $C_{15}$–$C_{20}$ cracked-wax olefin was placed in a vessel with 60 g. (1.5 mol) of NaOH and 800 g. of $H_2O$, and the mixture stirred until homogeneous. Then 166 g. (0.25 mol) of $Al_2(SO_4)_3 \cdot 18H_2O$ dissolved in 500 g. $H_2O$ was added. The reaction yielded a white precipitate, which was filtered from the solution and dried to yield 212 g. of a white powder. The material had an aluminum content of 6.5%, compared with 6.8% for the theoretical soap, and 25% $O_2$, compared to 20% for the theoretical soap.

Example 4.—In situ preparation of alkenylsuccinate thickened grease

A 47 g. (0.11 mol) portion of an alkenylsuccinic anhydride derived from a $C_{11}$–$C_{15}$ cracked-wax olefin fraction and 298 g. of a California solvent-refined neutral oil having a viscosity of 480 SSU at 210° F. were placed in a resin flask equipped with a mechanical stirrer and heating mantle. 2 g. of $H_2O$ was then added to the mixture, and it was heated with stirring to 300° F. for about 1 hour to effect hydrolysis of the anhydride. A 23 g. (0.11 mol) portion of aluminum isopropoxide was then added, and the mixture was stirred at 250°–260° F. for about 1 hour. Another 2 g. portion of $H_2O$ was added to hydrolyze the remaining alkoxide, and the mixture was heated for 1 hour at 200° F. The isopropyl alcohol was then stripped from the mixture, and the remaining grease was milled twice through a three-roll mill, yielding a smooth grease having a 15% gellant concentration and giving an ASTM unworked penetration of 211 and a worked penetration of 283.

In order to demonstrate the superior characteristics of the grease compositions of this invention, samples of the greases were prepared and compared with conventional lithium hydroxystearate greases and an aluminum alkenylsuccinate grease prepared from a branched-chain olefin, i.e. tetrapropylene. The tests employed include the Navy High Speed Bearing Test, which is described in Federal Test Method No. 331.1. In this test a ball bearing was operated at 10,000 r.p.m. continuously for approximately 22 hours at 300° F. while being lubricated with the subject grease sample. The apparatus was then cooled to room temperature during a period of 2 hours. This procedure of operating and cooling was repeated until there was bearing failure. The number of hours to bearing failure is indicated as "bearing life."

Also included are the ASTM penetration, both worked and unworked, and heat stability measured by the Kofler Heizbank Method and by the thin film method at 300° F. The base oil in these tests was a California paraffin-base oil having a viscosity of 480 SSU at 100° F. The bearing life recorded in the next to the last column of the table includes several determinations and a geometric means (in parentheses).

Also employed was a test performed in an antifriction machine. This test is designed to evaluate the work stability of a grease in an overpacked bearing. In the test the apparatus used consists of two bearing pedestal mounts equipped with No. 208 ball bearings mounted on a splined shaft which is spring loaded in an axial direction to 500 pounds. The bearing mounts are equipped with heating elements to maintain them at desired temperatures. The shaft and thus the bearings are turned at 1750 r.p.m. by an electric motor. In the test the bearings are packed with a measured amount of the subject grease; the shaft is turned for 18 hours at a predetermined temperature setting. After this period, the bearings are disassembled, the grease is inspected and weighed, and the grease character and percent of the original sample that remains is reported. The test was run at ambient temperature (about 85° F.).

and resulted only in a viscous suspension. It may also be noted that the compositions prepared from the straight-chain alkenylsuccinates gave greases that were heat stable, had excellent dropping points and ASTM penetration values. In addition, the data show that the high-speed bearing tests give a much higher bearing life for the $C_{15}$-$C_{20}$ alkenylsuccinate grease than for a commercial lithium hydroxystearate grease, i.e. a bearing life of 460 hours compared with 90, or better than 5 to 1. Also, it may be noted that the sample containing 2% of phenyl-α-naphthylamine oxidation inhibitor gave 800 hours bearing life, an extremely high value. Sample 6—A grease prepared from an alkenylsuccinate from an isomerized cracked-wax olefin fraction and thus possessing a branched alkenyl group became gelatinous in the cold Anti-friction Machine Test while the greases prepared from straight-chain materials remained smooth. Greases which become gelatinous are poor lubricants. This data shows that the straight-chain or normal structure is essential to the grease.

A high-temperature viscosity test shows the advantage of the straight-chain alkenylsuccinate grease over an aluminum stearate grease. In the tests, viscosities of the grease samples were measured over a temperature range of 100°–350° F. employing a rotational viscometer at 20 r.p.m. The alkenylsuccinate grease was that prepared in Example 4. The aluminum stearate grease had a similar base oil and a gellant concentration of about 10% by weight. The results of the tests are compiled in Table II following.

TABLE II.—VISCOSITY OF ALUMINUM SOAP GREASES AT HIGH TEMPERATURES

| Rotational Viscometer at 20 r.p.m. | Apparent Viscosity, poises at— | | | | | |
|---|---|---|---|---|---|---|
| | 100° F. | 150° F. | 200° F. | 250° F. | 300° F. | 350° F. |
| Al Stearate Grease | 250 | 150 | 85 | [1] 250 | [1] 250 | [1] 200 |
| Al Alkenylsuccinate Grease [2] | 270 | 260 | 230 | 200 | 150 | 110 |

[1] Rubbery.
[2] Smooth and greaselike over the whole range.

These data show that the straight-chain aluminum alkenylsuccinate grease exhibits a smooth decrease in viscosity to 350° F. while the conventional aluminum stearate, probably because of the polymeric structure of the soap, reaches a high viscosity and becomes rubbery in the range of 250° to 300° F. The succinate grease which remained smooth and greaselike over the range thus provides lubrication superior at high temperatures to the stearate grease which became rubbery, losing its effectiveness as a lubricant.

TABLE I

| | Thickener conc., Percent | Dropping Point, ° F. | ASTM Penetration | | Grease Description | Heat Stability Heizbank | Heat Stability Thin Film, 300° F. | High Speed Bearing Life (hours) | Antifriction Machine Test-cold |
|---|---|---|---|---|---|---|---|---|---|
| | | | Unworked $P_0$ | Worked $P_{60}$ | | | | | |
| 1. Al tetrapropenylsuccinate | 20 | | (¹) | (¹) | Viscous suspension. | | | | |
| 2. Do | 25 | | (¹) | (¹) | do | | | | |
| 3. Al alkenylsuccinate (from $C_{11}$-$C_{15}$ cracked-wax olefin). | 25 | 564 | 337 | 367 | Smooth | Plastic to 500° F. | Stable, 1 week plus. | | No. 1, 85% smooth. |
| 4. Al alkenylsuccinate (from $C_{15}$-$C_{20}$ cracked-wax olefins). | 15 | 513 | 211 | 283 | do | do | Stable, 100 hr. plus. | 273;513;703 (460). | No. 1, 100% smooth. |
| 5. Al alkenylsuccinate (from $C_{18}$-$C_{20}$ cracked-wax olefins). | 22 | 577 | 275 | 323 | do | do | Stable, 2 weeks plus. | | |
| 6. Al alkenylsuccinate (from isomerized $C_{15}$-$C_{20}$ cracked-wax olefins-secondary alkyl group). | 30 | 603 | 243 | 321 | do | do | Stable, 1 week plus. | | No. 1, 100% gelatinous. |
| 7. Lithium hydroxystearate | 10 | | | | | | | 312;88;39 (90). | |
| 8. Same as No. 4 with 2% phenyl-alpha-naphthylamine inhibitor. | 15 | | | | | | | 733;870 (800). | |

[1] Too soft.

It may be seen from the data in the above table that it was impossible to prepare a suitable grease from the aluminum tetrapropenylsuccinate material. (See Samples 1 and 2.) Thus, compositions prepared using these as thickeners were too soft to record an ASTM penetration Attempts were made to produce lithium and calcium soaps of the subject alkenylsuccinate groups. However, these materials failed to gel oil.

The soaps of this invention are employed in the compositions in amounts sufficient to thicken the base oils to the consistency of greases. In general, amounts of from 5 to 50% by weight are sufficient; amounts from 10 to 30% are preferred.

The oils which can be used as base oils for the compositions of this invention include a wide variety of lubricating oils, such as naphthenic-base, paraffin-base, and mixed-base lubricating oils, other hydrocarbon lubricants, e.g. lubricating oils derived from coal products, and synthetic oils, e.g. alkylene polymers (such as polymers of propylene, butylene, etc., and the mixtures thereof), alkylene oxide-type polymers (e.g. alkylene oxide polymers prepared by polymerizing alkylene oxide, e.g. propylene oxide polymers, etc., in the presence of water or alcohols, e.g. ethyl alcohol), carboxylic acid esters (e.g. those which were prepared by esterifying such carboxylic acids as adipic acid, azelaic acid, suberic acid, sebacic acid, alkenylsuccinic acid, fumaric acid, maleic acid, etc., with the alcohols, such as butyl alcohol, hexyl alcohol, 2-ethylhexyl alcohol, pentaerythritol, etc.), liquid esters of acids of phosphorus, alkylbenzenes, polyphenyls (e.g. biphenyls and terphenyls), alkylbiphenyl ethers, polymers of silicon (e.g. tetraethyl silicate, tetraisopropyl silicate, tetra (4-methyl-2-tetraethyl) silicate, hexyl (4-methyl-2-pentoxy) disiloxane, poly(methyl) siloxane, and poly (methylphenyl) siloxane, etc.

The base oils can be used individually or in combinations, wherever miscible or wherever made so by use of mutual solvents.

In addition to the soaps, there may be employed in the greases various other common additives, such as oxidation inhibitors, corrosion inhibitors, dyes, etc.

What is claimed is:

1. A grease composition comprising a major portion of an oil of lubricating viscosity and a minor portion, sufficient to thicken said oil to the consistency of a grease, of an aluminum soap of a substituted succinic acid of the structure:

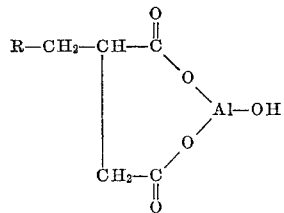

in which R is a straight chain alkyl or alkenyl group of from 10 to 24 carbon atoms.

2. The composition of claim 1 wherein the aluminum soap is present in the amout of from 5 to 40% by weight.

3. The composition of claim 2 wherein R contains from 15 to 20 carbon atoms.

4. The composition of claim 3 wherein the oil of lubricating viscosity is a mineral lubricating oil.

5. The composition of claim 3 wherein R is derived from a cracked-wax olefin fraction.

References Cited
UNITED STATES PATENTS

| | | | |
|---|---|---|---|
| 2,528,373 | 10/1950 | Knowles et al. | 252—35 |
| 2,868,729 | 1/1959 | Nelson et al. | 252—39 |
| 3,076,763 | 2/1963 | Nelson | 252—39 |

DANIEL E. WYMAN, *Primary Examiner.*

I. VAUGHN, *Assistant Examiner.*